Aug. 19, 1958 F. H. SHEPARD, JR 2,847,867
FOLLOW-UP DEVICE
Filed Aug. 24, 1943 5 Sheets-Sheet 1
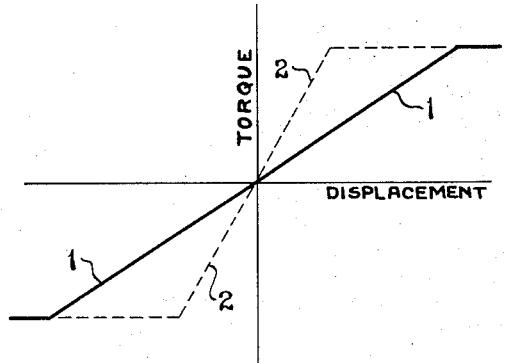
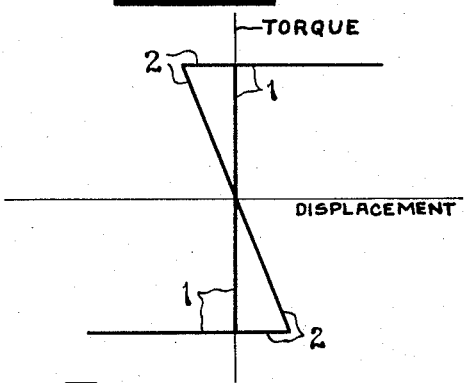
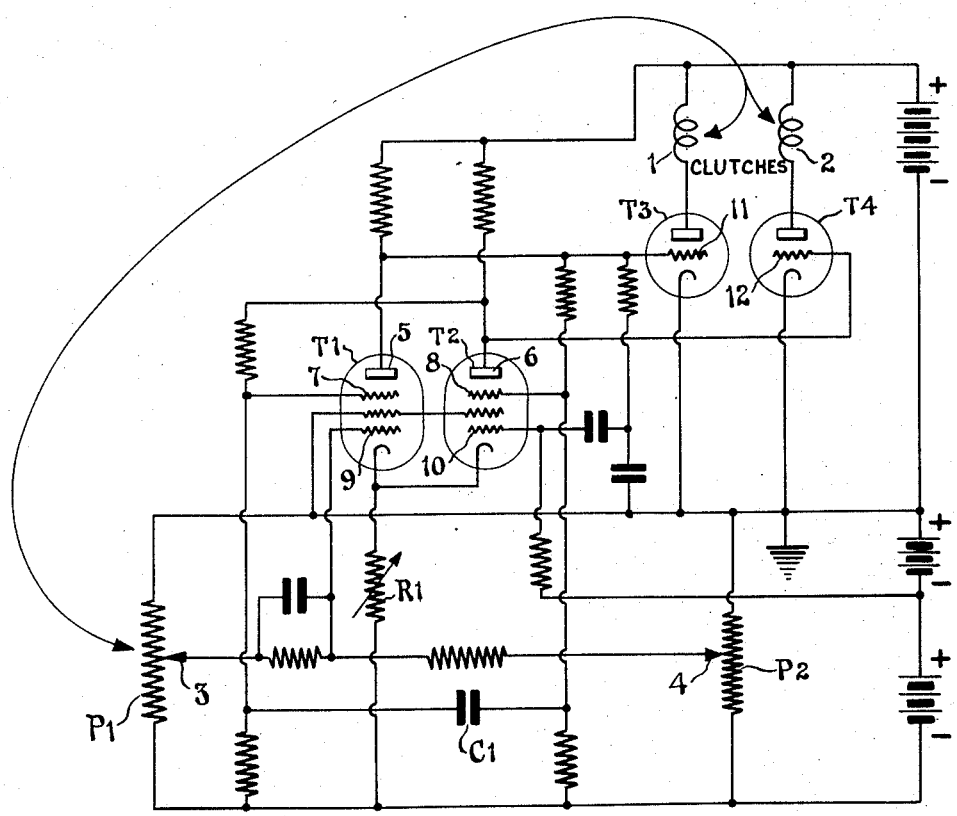
INVENTOR.
FRANCIS H. SHEPARD, JR.
BY
*Darby & Darby*
ATTORNEYS

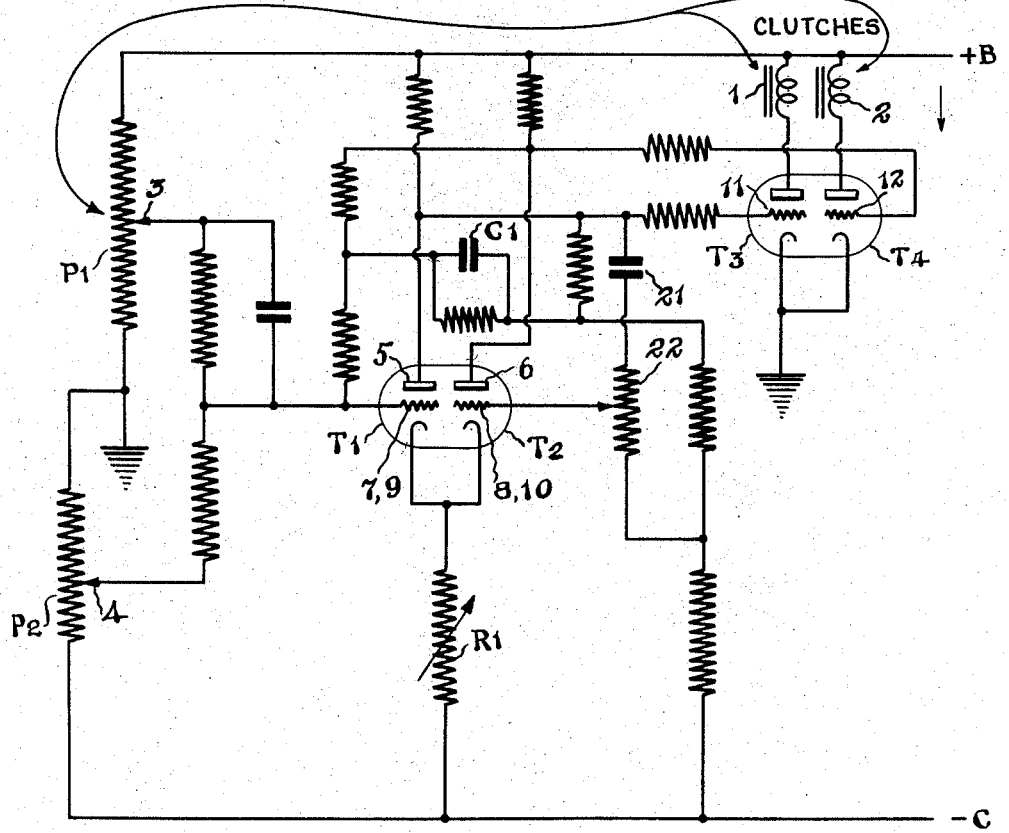
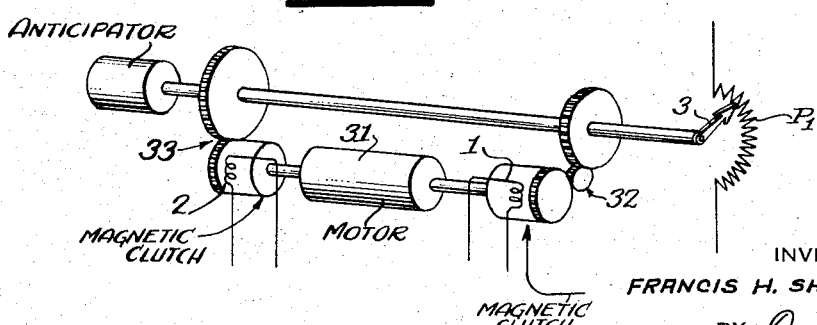

Aug. 19, 1958  F. H. SHEPARD, JR  2,847,867
FOLLOW-UP DEVICE
Filed Aug. 24, 1943  5 Sheets-Sheet 3

INVENTOR.
FRANCIS H. SHEPARD, JR.
BY
Darby & Darby
ATTORNEYS

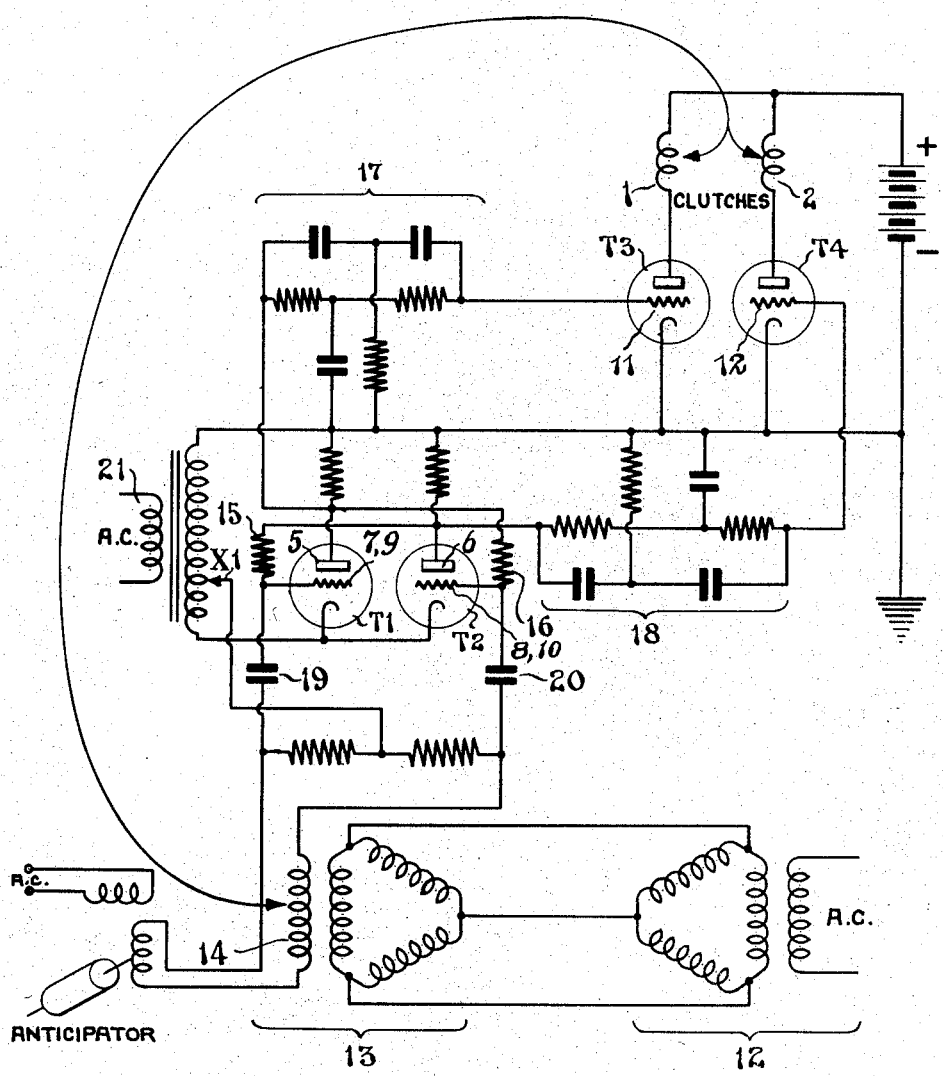

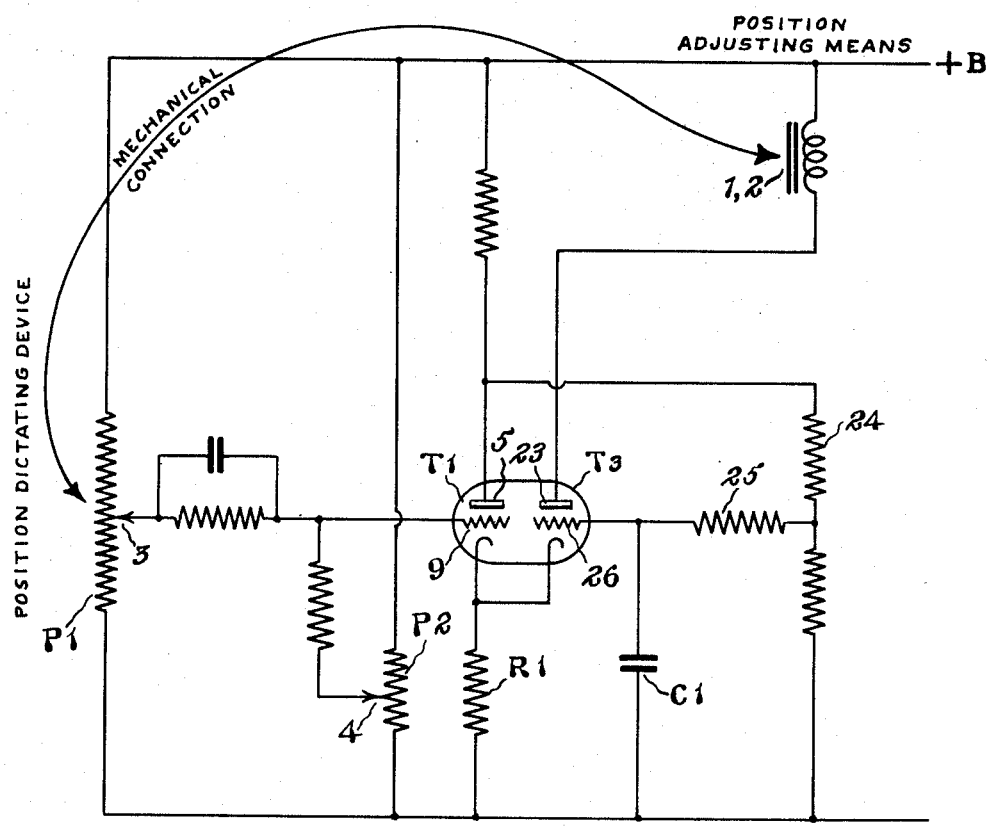

United States Patent Office 2,847,867
Patented Aug. 19, 1958

2,847,867

FOLLOW-UP DEVICE

Francis H. Shepard, Jr., Madison, N. J., assignor, by mesne assignments, to Remco Electronic, Inc., New York, N. Y., a corporation of New York Application August 24, 1943, Serial No. 499,774

21 Claims. (Cl. 74—388)

In the follow-up devices now in use the deviation of the system from a balanced position causes a finite amount of signal which is utilized in the system in such a way as to correct for the deviation and restore the balance. In such systems as heretofore constructed a definite displacement is required before a torque of sufficient magnitude to overcome the friction in the system is generated. The result is that it is difficult with such systems to follow very small deviations.

The object of my invention is to provide a follow-up device which is substantially unaffected by frictional loading so that minute deviations may be positively and accurately followed. Such a device is of particular importance in gun-fire control, for example, where minute adjustments are necessary in sighting on and following a target. It is also of importance in distance writing systems where, if the control is sufficiently sensitive, handwriting may be reproduced at a distance with sufficient accuracy to enable it to be recognized as the handwriting of a particular individual, thereby establishing authenticity. This is of vital importance in war activities. With this accuracy a distance writing device has much greater utility because it may be used to transmit map information, etc.

One embodiment of my invention uses electrically energized magnetic clutches having opposing torques. The normal drag on the clutches is low. When a substantial output torque is called for current in one clutch rises, while the current in the other drops to zero.

Another feature of my invention is the provision of regenerative means for accentuating the unbalance produced by a deviation in the system, whereby restoration is facilitated.

Another feature of my invention is the provision of means for retarding the rate of accentuation of the unbalance so that it is slower than the mechanical system, permitting restoration from small deviations without producing excessive restoring torques that would cause overshooting or "hunting."

In the drawings:

Figure 1 shows a typical displacement versus restoring torque characteristic for existing systems;

Figure 2 shows two possible displacements versus restoring torque characteristics for my system;

Figures 3 and 4 show practical circuit adaptations embodying my invention using direct current balancing potentials;

Figure 6 is a circuit embodiment showing how the system may be used in connection with alternating current balancing potentials, such as derived from a synchronous transformer, as a follow-up device;

Figure 7 shows a modification of my invention in which the output is balanced at a finite current, that is, the electro-mechanical system drives one way for current in the output above the balance point and the other way for current below the balance point; and Figure 8 shows one form of mechanical structure which may be used in the present system.

Figure 5:
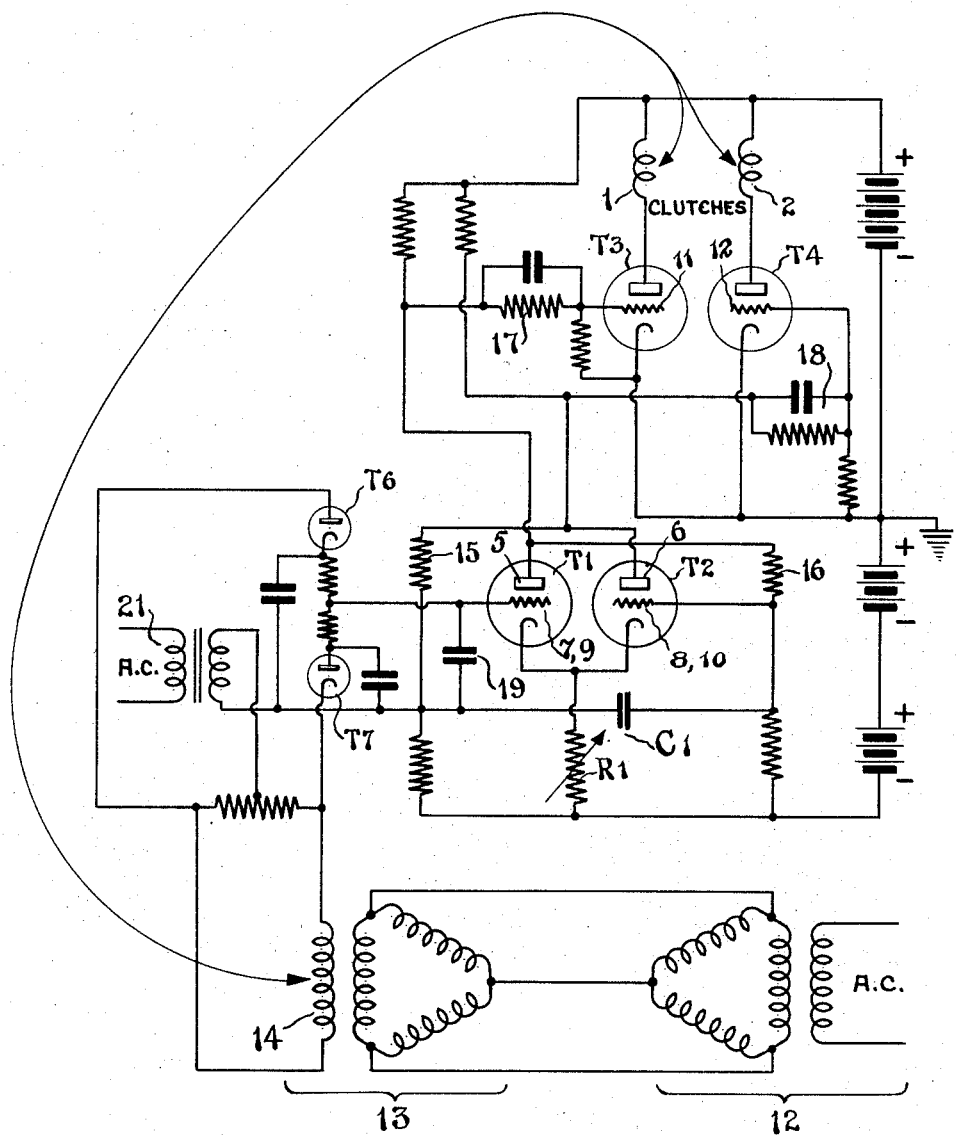
Figure 5 shows another circuit embodiment of my invention with alternating current balancing potentials in which a diode phase detector is used.

Curve 1 of Figure 1 shows a typical displacement versus restoring torque characteristic for existing systems. It may be seen that with this type of characteristic a definite displacement is required before the torque reaches sufficient magnitude to overcome the inertia and friction in the system. Attempts to steepen the characteristic to produce one illustrated by curve 2 of Figure 1, or a steeper one, result in instability of the system, that is "hunting."

My system is infinitely sensitive, having the displacement versus torque characteristic illustrated in Figure 2 by either curve 1 or curve 2. These are the characteristics of the device when the called for displacement changes are slow. When the called for rates of change of displacement are high the characteristic takes a finite positive slope which decreases as the called for rates of change increase. The system is in effect in unstable equilibrium. That is, in operation it continuously balances itself about a point and will respond with great accuracy to minute deviations.

In the remaining drawings similar reference characters refer to similar parts throughout.

In Figures 3 and 4 I have illustrated two magnetic clutches by the coils 1, 2, and indicated a mechanical linkage between these clutches and the pointer 3 on potentiometer P1. It will be understood that energization of coil 1 will move the pointer 3 in an upward position on potentiometer P1 and energization of coil 2 will move the pointer 3 in a downward direction. A positioning device calling for various changes in the position of pointer 3 is illustrated by the pointer 4 on potentiometer P2. The pointer 4 will be moved to a desired position on potentiometer P2, and the device will operate to move the pointer 3 to a complementary position on potentiometer P1, thus causing the pointer 3 to indicate the position of pointer 4.

My device also includes a self-balancing phase inverter amplifier having two tubes T1 and T2 which are illustrated as triodes or pentodes, and two power amplifier tubes T3 and T4 which operate directly to energize the magnetic clutches 1 and 2 which drive the mechanical system.

In Figure 3 there is a direct balanced regenerative feedback between the plates 5, 6 and the suppressor grids 8, 7 of the balanced amplifier stage T1 and T2. That is if the plate current of the tube T1 should start to increase the plate voltage will decrease. This decrease in plate voltage will be applied to the suppressor grid 8 of tube T2 causing a decrease in plate current of tube T2. This decrease in plate current results in an increase in plate voltage of tube T2. This increase in plate voltage of tube T2 is applied to the suppressor grid 7 of tube T1 causing it to swing more positive, causing plate current in tube T1 to be still further increased, and so on. This action will continue until the current of tube T1 reaches a maximum and the current of tube T2 is either cut off or reaches a minimum.

Similarly, if the plate current of tube T2 should start to increase its plate voltage will decrease and this decrease is applied to the suppressor grid 7 of tube T1, causing a decrease in plate current of tube T1, resulting in an increase in plate voltage of plate 5, causing the suppressor 8 of tube T2 to be swung more positive.

A condenser C1 is connected between the suppressor grids of tubes T1 and T2 in order to limit the rate at which the above mentioned cycle occurs. Since this rate is thus made to occur slowly, time is allowed for the clutches to drive potentiometer P1 to cause a rebalancing of the system before the regenerative accentuation of the unbalance just described has had a chance to go very far. That is, as the voltage on the plate 5 of tube T1 starts to decrease, the regenerative feedback explained above will cause it to decrease further. The condenser C1, however, limits the rate of decrease. Before the decrease has gone too far the clutch 2 will move the pointer 3 downward to a position to decrease the voltage on grid 9. This decrease reacts directly on the current to plate 5 causing an increase in its potential, thus restoring the circuit to a state of equilibrium. It is understood that voltage on the grid 9 of the tube T1 results, through the common coupling of resistor R1, in a comparable voltage of reverse polarity being applied between the grid and cathode of tube T2. Thus in the event of a decrease in the voltage on plate 6 of tube T2 the mechanical system restores the circuit to equilibrium by moving the pointer 3 upward to restore equilibrium before the change has gone too far—that is, before the unbalance has been over accentuated.

Thus for small deviations of the pointer 4 the mechanical system responds before the unbalance is accentuated sufficiently to cause too great a restoring force, and consequent overshooting or "hunting." "Hunting" may also be controlled by additional elements of the electrical circuit which are described and claimed in my copending application Serial No. 563,566, filed November 15, 1944, entitled "Damping of Follow-up Mechanism", now abandoned.

If the pointer 4 is moved upward the potential on grid 9 of tube T1 will be increased and the system will be unbalanced. This will cause current to flow through tube T1 resulting in a lowering of the potential on plate 5 of this tube and a consequent lowering of the potential on grid 11 of tube T3, and, by common coupling through cathode resistor R1 and the unbalance accentuating means, causing an increase in the potential of plate 6 of tube T2 and of grid 12 of tube T4, the two grids 11 and 12 being connected to the plates of tubes T1 and T2. Consequently less current will flow through tube T3 and more current through tube T4, causing a larger torque to be produced by clutch 2 and a smaller torque by clutch 1. The pointer 3 will accordingly be lowered by the mechanical system to complement pointer 4 and restore the balance in the device. Similarly, if the pointer 4 is lowered less current will flow through tube T1 and more through tube T2, putting a higher potential on grid 11 of tube T3 and a lower potential on the grid 12 of tube T4, causing more current to flow through clutch 1 and less through clutch 2, which accordingly act to raise the pointer 3 to follow the pointer 4.

Resistance R1 is provided to control the normal amount of current passed by tubes T1 and T2, so that a balanced bias on the ouput tubes T3 and T4 may be set at any desired value. In this way in the balanced position the magnetic clutches may be made as free as desired.

Figure 4 shows a circuit embodying the principles just described in Figure 3 except that the functions of grids 7 and 8 of Figure 3 have been taken over by the triode grids of the tubes T1 and T2 in Figure 4, which have accordingly been marked grid 7, 9 and grid 8, 10. The condenser C1, which slows the rate of regenerative unbalance accentuation, is inserted between the symmetrical sides of the resistance network connecting plates 5 and 6 with grids 8, 10 and 7, 9. This is necessary in order to prevent C1 from bypassing signal currents or signal voltages being applied directly to grid 7, 9 and through the common coupling resistor R1 to grid 8, 10. In Figure 4 a regenerative damping means described in my copending application No. 563,566, referred to above, is applied to grid 8, 10 through condenser 21 and resistance 22. This, however, does not alter the functioning of the circuit as described in the description of Figure 3.

In Figures 5 and 6 I have shown how my system may be applied in connection with the use of a synchronous transformer as a follow-up device for applications such as gunfire control with alternating current balancing potentials.

In these figures a synchronous transformer 12 is used as the position dictating device and the synchronous transformer 13 as the follow-up or position adjusting device, the coil 14 of the synchronous transformer 13 being moved in one direction or the other by the clutches 1 and 2 as the slides 3 of potentiometer P1 was in the preceding description.

Figure 5 shows a modification of Figure 4 in which a diode phase detector, including the two diodes T6 and T7, is used. In this circuit the amplifier, comprising tubes T1 and T2, is balanced for zero voltage across condenser 19. When the synchronous transformer 12 is moved a voltage will appear across the coil 14 which will be either in phase or out of phase with the voltage from supply line 21, causing more or less current, as the case may be, through tube T6 and correspondingly less or more through tube T7, as will be understood by those skilled in the art, thus varying the voltage applied to the grid 7, 9 of tube T1. The operation of this circuit is otherwise the same as those previously discussed, the clutches 1 and 2 operating to restore the coil 14 to a position of zero voltage across it.

Damping means in Figure 5 are illustrated as 17, 18, and operate in a manner which will be understood by those skilled in the art.

In the case of Figure 6 the voltage for accentuating the unbalance of the system is fed back between the plates and grids of the tubes T1 and T2 through the resistances 15 and 16. Alternating voltage of power frequency is applied as plate supply to the tubes T1 and T2. These tubes conduct on one-half of the cycle, causing the plates of the tubes to assume a potential which is negative with respect to ground. The pointer X1 controls the amount of this potential so that again the balanced bias on the output tubes T3 and T4 may be set at any desired value. The power frequency pulsations appearing on the plates of tubes T1 and T2 are filtered by the re-entrant filters 17, 18 so that essentially direct current is applied to the grids of the power output tubes T3 and T4. Re-entrant filters are shown in this figure rather than straight condenser resistor filters because they reduce the speed of response much less than a condenser large enough to give equally effective filtering at power frequency.

When the system is in dynamic balance and the output voltage of the synchronous transformer 13 is zero tubes T1 and T2 conduct equal amounts of current biasing the output tubes T3 and T4 equally, and thus energizing the clutches equally. If, however, the synchronous transformer 13 is unbalanced the output of the tubes T1 and T2 will be a power frequency D. C. pulsation that in each tube is either greater or smaller, depending on whether the input voltage is in phase or 180 degrees out of phase with the voltage applied to the plates of tubes T1 and T2. If the synchronous transformer 13 is moved in a direction to cause the voltage on the grid of tube T1 to be out of phase with the voltage on its plate, tube T1 will conduct less current and its plate will be more positive, will apply a more positive potential to the grid of tube T3 and cause more current to flow in clutch 1. The grid of tube T2 will have a voltage applied to it which is in phase with the power voltage applied to its plate, causing more current to flow through tube T2, with a consequent lower voltage on its plate which in turn is applied to the grid of tube T4, causing less current to flow through clutch 2. The unbalance is accentuated as before described by the cross feed from the plates of tubes T1 and T2 to the grids of the other tube through resistances 15 and 16, but this tendency for accentuation is retarded in this case by the condensers 19 and 20, which here serve the function of condenser C1 in the preceding figures. The clutches 1 and 2 will operate to restore the coil 14 to a position of zero voltage across it. A two phase motor, marked "anticipator" is shown in this figure as a possible means to control hunting. The motor is energized on one phase by the A. C. line, while the other phase is placed in series with the synchronous transformer output. The two phase motor is driven by the output shaft and generates an A. C. voltage proportional to speed, hence helps control hunting.

In Figure 7 I have illustrated a modification of my invention in which the output is balanced at a finite current, that is, the electro-mechanical system drives one way for current in the output above the balance point and the other way for current below the balance point. In this figure the pointer 4, as before, is the position dictating device and the pointer 3 is the follow up device. Movement of the pointer 4 in an upward direction applies a more positive voltage to the grid 9 of tube T1 causing a decrease in the potential of the plate 5 of tube T1. Increased current of tube T1 causes the cathode of this tube to be swung more positive. This is effectively the same as though the potential between grid 26 and cathode of tube T3 were increased in a negative direction causing a decrease in current through the position adjusting means thereby causing a re-adjustment of pointer 3 on the position indicating device. It should also be noted that an increasing voltage on grid 9 causing a decreasing voltage on plate 5 of the tube T1 also causes, through the coupling network of resistors 24, 25, a decreasing potential to be applied to grid 26 of tube T3. This potential is applied only after condenser C1 has been charged. Thus in this figure there is the same accentuating effect as described in the previous figures, and again the same time factor introduced by the condenser C1. Also as before the mechanical system will respond faster than the accentuating means in the electrical system so that when the position adjusting means is at rest any instability will be automatically corrected by a change in voltage on the grid 9 due to the operation of the mechanical system before excessive accentuation of the electrical system has taken place. In the event the pointer 4 is moved downward the reverse of all that has been just described will take place.

Figure 8 shows one form of mechanical drive arrangement, in which a continuously rotating motor 31 drives pointer 3 of potentiometer P through either magnetic clutch 1 and its gearing 32 or through magnetic clutch 2 and its gearing 33, according as the exciting coils of these clutches 1 and 2 are energized by the circuits described above. Since gearing 32 produces a reverse direction of rotation of pointer 3 from that produced by gearing 33, pointer 3 is driven in one direction or the other according as coils 1 and 2 are energized. Where an anticipator is used, as in Figure 6, it is directly coupled to the drive shaft for pointer 3.

It will be understood, of course, that in the earlier figures as well the various position adjusting means mentioned in connection with Figure 7 may be used instead of the clutches illustrated and described.

It is obvious that my device is capable of various modifications, and I do not wish to be restricted to the particular circuits and devices illustrated, but only by the scope of the appended claims.

What is claimed is:

1. A follow-up device comprising a position dictating device, a differential position adjusting device, a balanced amplifier for controlling the amount and direction of energy supplied to said adjusting device, means responsive to change of position of said dictating device to unbalance said amplifier, time delay means for accentuating said unbalance, means for controlling the rate at which said unbalance is accentuated, and means responsive to said unbalance for actuating said adjusting device and restoring balance in said amplifier.

2. A follow-up device comprising a pair of magnetic clutches operating to provide opposing forces, a balanced amplifier, means responsive to a balanced condition in said amplifier for energizing said clutches equally, and means responsive to a deviation from balance in said amplifier for varying the energization of said clutches differentially.

3. A follow-up device comprising a position dictating device, a differential position adjusting device, a balanced amplifier for controlling the amount and direction of energy supplied to said differential device, means responsive to change of position of said dictating device to unbalance said amplifier, time delay means for accentuating said unbalance, and means responsive to said unbalance for actuating said adjusting device and restoring balance in said amplifier.

4. A follow-up device comprising a position dictating device, a balanced amplifier, means whereby deviations in said position dictating device unbalance said amplifier, time delay means for accentuating said unbalance, a pair of power amplifiers coupled to the output of said balanced amplifier, a position restoring device in the output of each of said power amplifiers whereby said devices are differentially energized in proportion to the voltage on the anodes of said balanced amplifier, and means whereby said position restoring devices restore the balance of said balanced amplifier.

5. A follow-up device comprising a position dictating device, a position adjusting device, a pair of magnetic clutches for operating said position adjusting device, a pair of power amplifiers for energizing said magnetic clutches, a balanced amplifier for controlling the current in said power amplifiers, means responsive to deviations in said position dictating device for unbalancing said balanced amplifier and accentuating said unbalance, and means whereby said clutches are operated to restore said balance.

6. A follow-up device comprising a balanced amplifier, means for applying an alternating current voltage to the anodes of said amplifier, means for applying a voltage to the grids of said amplifier in additive or opposing phase to the voltage applied to its anodes, a pair of power amplifiers, means for controlling the current through said power amplifiers in proportion to the voltage developed on the anodes of said balanced amplifier, a pair of magnetic clutches in the outputs of said power amplifiers, and means whereby said clutches operate to vary the voltage applied to the grids of said balanced amplifier.

7. A follow-up device comprising a Selsyn transformer, a synchronous transformer connected thereto, a balanced amplifier, means responsive to deviations in the output of the synchronous transformer for varying the voltage on the grids of said balanced amplifier, a pair of power amplifiers coupled to the output of said balanced amplifier, a pair of clutches in the outputs of said power amplifiers, and means whereby said clutches vary the voltage applied to grids of said balanced amplifier.

8. A follow-up device comprising a balanced amplifier, a power amplifier coupled thereto, an adjusting device in the output of said power amplifier, and means whereby the current in said balanced amplifier may be unequally varied to vary the current in said adjusting device, and time delay means for accentuating said inequality.

9. A follow-up device comprising a position dictator, a position follower, a mechanical system for operating the follower, an electrical system responsive to the dictator for controlling the mechanical system, means for rendering the electrical system unstable, and means whereby the mechanical system operates more rapidly than the electrical system so that overall equilibrium is maintained.

10. A follow-up device comprising a position dictator, a position follower, a mechanical system for operating the follower, an electrical system responsive to the dictator for controlling the mechanical system, means for rendering the electrical system unstable, and means whereby the electrical system operates more slowly than the mechanical system so that overall equilibrium is maintained.

11. A follow-up device comprising a position dictator, a position follower, a mechanical system for operating the follower, an electrical system responsive to the dictator for controlling the mechanical system, means for rendering the electrical system unstable, and means comprising a condenser whereby the electrical system operates more slowly than the mechanical system so that equilibrium is maintained.

12. A follow-up device comprising a position dictator, a position follower, a mechanical system for operating the follower, an electrical system responsive to the dictator for controlling the mechanical system, means for rendering the electrical system unstable, and a time delay circuit in the electrical system whereby the electrical system operates more slowly than the mechanical system so that equilibrium is maintained.

13. A follow-up device comprising a position dictator, a position follower, a mechanical system for operating the follower, an electrical system responsive to the dictator for controlling the mechanical system, means for rendering the electrical system unstable, means for accentuating the instability of the electrical system, and means whereby the accentuating means operates more slowly than the mechanical system so that equilibrium is maintained.

14. A follow-up device comprising a position dictator, a position follower, a mechanical system for operating the follower, an electrical system responsive to the dictator for controlling the mechanical system, means in the electrical system for instantaneously amplifying the controlling effect in order to secure immediately a strong restoring force on the follower, and means for delaying extreme amplification so that extreme amplification occurs more slowly than the mechanical system operates, whereby the device is maintained in stable equilibrium.

15. A follow-up device comprising a position dictator, a position follower, a mechanical system for operating the follower, an electrical system responsive to the dictator for controlling the mechanical system, regenerative means for rendering the electrical system unstable, and means for delaying the operation of said regenerative means so that it operates more slowly than the mechanical system, whereby overall stable equilibrium is maintained.

16. A follow-up device comprising a balanced system, an amplifier therein, means for applying an alternating current phasing voltage to said amplifier, means for applying a signal voltage to the inputs of said amplifier in additive or opposing phase to the phasing voltage applied thereto, means whereby said signal voltage unbalances said system, time delay means for accentuating said unbalance, mechanical driving means in the output of said amplifier, and means for controlling the force and sense of said driving means in correspondence with the unbalance of said system.

17. A device in accordance with claim 16 in which said unbalance accentuating means operates more slowly than the mechanical system so that the overall equilibrium is maintained.

18. A device in accordance with claim 16 including a condenser whereby said unbalance accentuating means operates more slowly than the mechanical system so that the overall equilibrium is maintained.

19. A device in accordance with claim 16 including a time delay circuit whereby said unbalance accentuating means operates more slowly than the mechanical system so that the overall equilibrium is maintained.

20. A device in accordance with claim 14 in which said unbalance accentuating means operates more slowly than the mechanical system so that the overall equilibrium is maintained.

21. A device in accordance with claim 15 in which said unbalance accentuating means operates more slowly than the mechanical system so that the overall equilibrium is maintained.

References Cited in the file of this patent

UNITED STATES PATENTS

| | | |
|---|---|---|
| 2,040,014 | Moseley | May 5, 1936 |
| 2,114,835 | Fouquet | Apr. 19, 1938 |
| 2,115,086 | Riggs | Apr. 26, 1938 |
| 2,333,393 | Ryder | Nov. 2, 1943 |
| 2,413,913 | Duke | Jan. 7, 1947 |
| 2,417,191 | Fox | Mar. 11, 1947 |
| 2,424,568 | Isbister | July 29, 1947 |